United States Patent Office 3,378,585
Patented Apr. 16, 1968

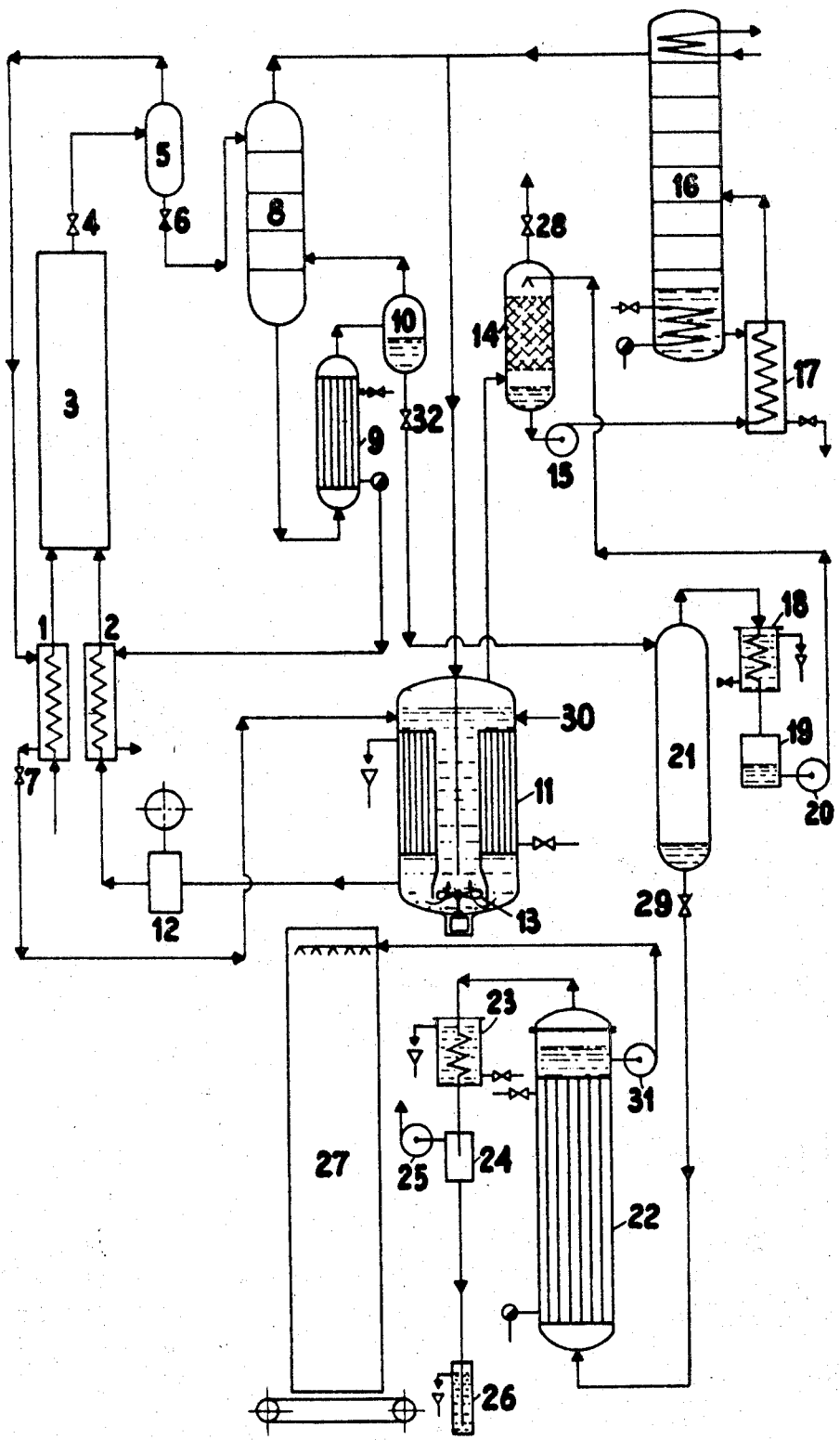

3,378,585
PROCESS FOR THE PRODUCTION OF UREA
Giacomo Fauser, Novara, Italy, assignor to Montecatini Edison S.p.A., a corporation of Italy
Filed July 26, 1963, Ser. No. 297,956
Claims priority, application Italy, July 27, 1962, 15,496/62
1 Claim. (Cl. 260—555)

My invention relates to a process for the production of urea from ammonia and carbon dioxide. More particularly, it relates to the process for complete utilization of these gases and the intermediate ammonium carbamate in such a process by a unique separation, purification and recycling scheme and an apparatus useful in such a process. Today most of the industrial production of urea is carried out by synthesis from ammonia and carbon dioxide in a reactor at about 200 atmospheres pressure and at temperatures higher than 150° C. Due to the reversible nature of the reaction, the yields are not quantitative and a considerable percentage of the two reactants remains either in the form of the unreacted gases or ammonium carbamate.

Many procedures have been proposed to recycle the unreacted carbamate into the reactor. A simple method that has been proposed is to condense the carbamate in the presence of water in such a manner as to obtain a concentrated solution of the carbamate that can be easily pumped into the reactor. However, water exerts an unfavorable influence upon the reaction and reduces the conversion of the carbamate into urea. Moreover, the heat balance is such that such a method requires an elevated heat consumption.

In order to avoid as much as possible the introduction of water, it has been proposed to effect the carbamate recycling by recovering the carbamate as a slurry composed of solid particles of carbamate in suspension in liquid ammonia, and to introduce that slurry into the reactor by means of a suitable pump. However, in practice difficulties are encountered owing to the peculiar properties of the slurry inasmuch as the carbamate does not stay in suspension and the rapid formation of the sediment of the salt causes clogging of the apparatus in which the suspension is formed by the condensation of the ammonia and the crystallization of the carbamate. Since these portions of the apparatus operate at elevated temperatures and considerable pressures, any mechanical failure of this type renders this type of process uneconomic. Another disadvantage of this particular type of process is that it requires the use of great excesses of ammonia which makes the recycling burdensome.

Another aspect of this type of process which causes considerable difficulty is the fact that it is necessary to carry out the distillation of the carbamate under pressure and it is necessary to operate at temperatures higher than 150° C. This has the effect of increasing the percent of water (formed during the conversion of the carbamate to urea) accompanying the carbamate as it is separated and at the same time increasing the dissociation of the urea and the formation of biuret (a contaminant tolerated according to commercial standards only to a maximum of 0.5% by weight). To avoid exceeding temperatures of 150° C. according to previously known processes, the distillation has been carried out at a pressure lower than 12 atmospheres and consequently the condensation of the ammonia and the crystallization of the carbamate were necessarily operated at a pressure and a thermal level so low that it was not possible to employ water as a cooling means. In order to achieve proper cooling it was necessary to have recourse to expensive refrigeration apparatus.

In another variation of this process, the separation of the carbamate from the urea is also carried out at a pressure higher than 12 atmospheres but the carbamate, recycled into the reactor suspension in liquid ammonia, is separated in a single stage. By such processes the decomposition of urea and the formation of biuret can only be avoided when the separation of the carbamate is a limited one only leaving in the urea solution a content of ammonia and ammonium carbamate of at least 3%. This 3% contamination of the final product cannot be economically recycled and converted into urea. Further it presents separation problems in the purification of the urea. It is an object of the present invention to overcome the aforegoing difficulties by providing an effective and economic process for recovering the ammonium and carbon dioxide that have not reacted to form urea and to recycle them together with the formed ammonium carbamate into the urea-synthesis autoclave.

The process aspects of this invention are based on a process for the production of urea from ammonia and carbon dioxide with full recycling of the non-converted reactants into the urea-synthesis reactor, said non-converted reactants being separated, in three distinct pressure stages, and then combined and recycled as a suspension of crystallized ammonium carbamate in liquid ammonia. This suspension is formed at a pressure of from about 13 to 25 atmospheres in a water-cooled vessel equipped with a special means for keeping the carbamate particles in suspension in the ammonia. This process permits, if desired, recycling of the non-converted reactants as a suspension of solid ammonium carbamate in liquid ammonia. This recycling may be total.

The separation, according to one aspect of this invention, of the non-converted reactants from the urea is carried out in three steps, respectively: at a pressure higher than 60 atmospheres; at a pressure of from 13 to 25 atmospheres; and at atmospheric or near atmospheric pressures.

In the first step or stage, nearly pure ammonia is separated, this is recondensed utilizing its heat of condensation to heat the carbon dioxide fed into the urea reactor. In the second step or stage there is separated a mixture of ammonia and carbon dioxide with small amounts of water and of inert gases such as nitrogen and hydrogen which may be present as impurities with the reactants. This gaseous mixture is bubbled through a stream of liquid ammonia. The carbon dioxide reacts with the ammonia and forms ammonium carbamate which remains suspended as solid particles in the liquid ammonia.

In the third step or stage there is separated a mixture of ammonium, carbon dioxide and water, which by means of cooling is transformed into aqueous ammonia and carbon dioxide solutions. This solution is distilled, in order to remove particle water, at a pressure almost equal to that at which the second stage of distillation of the urea solution is carried out. A mixture of ammonia and carbon dioxide with small quantities of water is obtained which is bubbled through the liquid ammonium together with the gaseous mixture separated in the second stage to form additional carbamate.

The non-converted reactants transformed by the above-described techniques into a suspension of solid ammonium carbamate in liquid ammonia are pumped back into the urea reactor, the aqueous urea solution is concentrated under vacuum and the urea obtained is then sent to a granulating chamber.

These and other features of the process aspects of this invention will be more fully understood from the following description of the process with reference to the accompanying figure.

The ammonia and carbon dioxide coming from the preheaters 2 and 1 respectively in molar proportions greater than 2:1, are introduced into the reactors 3 under a pressure of from 200 to 230 atmospheres. The reaction raises the temperature within the reactor up to about 190° C. The solution of urea, water, carbamate and excess ammonia is discharged through valve 4 into separator 5 at a pressure greater than 60 atmospheres, for instance at the pressure of 70 atmospheres. By reducing the pressure, about one-half of the ammonia present evaporates and is recondensed in heat exchanger 1 giving its latent heat to the carbon dioxide. It is possible in this manner to recover a considerable quantity of heat at a temperature sufficiently high to preheat the carbon dioxide up to about 100° C.

By means of valve 6, the pressure of the mixture of urea, water, carbamate and residual ammonia is further reduced to about 13 to 25 atmospheres, for instance to 16 atmospheres. This pressure reduction causes a subsequent evaporation of ammonia and a reduction of temperature to about 120° C. At this temperature the mixture is introduced at the head of distillation column 8, descending onto the lower plates, and is subjected to a rapid heating up to 170° C. by passing through heat exchanger 9. With this device it is possible to carry out a flash distillation of the carbamate with a minimum dissociation of urea and practically no formation of biuret.

The carbon dioxide and ammonia that are liberated in separator 10 at 170° C. contain more than 50% of water vapor as steam. When rising in the upper plates of rectifying column 8, they become cooled to 120° C. At this temperature the percentage of water in the carbamate vapors at the outlet of column 8 is reduced to 3% and the carbamate vapors can be transformed into solid carbamate, that is to say into crystals which may be contacted with liquid ammonia without any danger of incrustations so as to form a fluid slurry easily pumped and without any danger of incrustations.

The crystallization of the carbamate is carried out in apparatus 11 provided with axial propeller 13. This water-cooled apparatus has introduced into it from source 30, the ammonia in liquid form destined for the urea synthesis. The ammonia is employed in excess and is recondensed in column 14. Other sources of ammonia for apparatus 11 include the material recondensed in exchanger 1 coming from valve 7 and the vapors of ammonium carbon dioxide, carbamate and water coming from vessels 8 and 16.

The heat of formation of the solid carbamate and the heat of condensation of the ammonia is removed by cooling the suspension with water. The pressure at the interior of apparatus 11 in which the suspension is formed depends on the temperature of the water available to the heat exchanging water jackets. That pressure varies according to certain aspects of this invention from 13 to 25 atmospheres and is preferably in the range of 13 to 18 atmospheres.

If for instance water at 20° C. is available, it is easy to obtain a condensation temperature of 40° C. This corresponds to a pressure within vessel 11 of 16 atmospheres. The solid particles of carbamate have a specific gravity which is greater than that of liquid ammonia, and therefore they have a tendency to deposit at the bottom of the apparatus in which the suspension is formed thereby clogging the discharge piping system. To avoid the inconvenience of clogging up such an apparatus operating at such pressures and such temperatures, recourse according to the apparatus aspects of this invention is had to the action of an axial propeller pump 13 incorporated internally with the apparatus 11 in which the suspension is formed. This keeps the carbamate in suspension and provides sufficient agitation for effective heat exchange between the ammoniacal suspension and the cooling means (water-cooled) destined to remove the heat of formation of the solid ammonium carbamate and the condensation heat of the ammonia. By using this device, it is possible to obtain the slurry containing more than 50% of carbamate in a form sufficiently mobile to be pumped into the reactor without clogging the various orifices.

Any inert gases contained in the reactants, such as for instance hydrogen and nitrogen, accumulate in the upper part of apparatus 11 in which the suspension is formed and are sent into column 14. To recover the ammonia and carbon dioxide which may be flushed along with said inert gases, the mixtures are washed in column 14 with an aqueous solution of ammonium carbamate introduced by means of pump 20 and the inert gases are then discharged through the valve 28 while the carbamate solution of the ammonia and carbon dioxide which had been flushed is sent by means of pump 15 into preheater 17 and subsequently into the distillation column 16.

The distillation is effected at 16 atmospheres pressure and the carbamate vapors containing only 3% of steam are returned into apparatus 11 in which the suspension is formed.

The ammonia and carbamate slurry by means of pump 12 is sent at first into exchanger 2 where it is preheated to 120° C. utilizing the heat of the condensation water coming from distiller 9 and is then introduced into reactor 3.

The urea solution leaving the separator 10, under pressure of the second stage at a pressure of approximately 16 atmospheres and a temperature of approximately 170° C. under preferred modes of operation, still contains about 3% of carbamate. This is recovered by expanding the solution coming from separator 10 through valve 32 into separator 21. The expansion down to approximately atmospheric pressure results in a rapid evaporation at the expense of the latent heat. The carbamate dissolves in the water that is present as steam in cooler 18.

The solution that collects in tank 19, containing about 20% of carbamate, is sent by means of pump 20 into column 14 under a pressure of 13 to 25 atmospheres (for instance 16 atmospheres) to further absorb the carbamate contained in the inert gases that are discharged into the atmosphere.

The urea solution leaving separator 21 passes through valve 29 and is evaporated under vacuum in distiller 22 until a 99% concentration is obtained. Then by means of pump 31 it is conveyed and sprayed from the top of tower 27 by conventional methods to obtain a dry salt destined for agricultural uses. The vapors distilled in 22 are condensed in 23 and the condensed water is separated in 24 and discharged via 26. The non-condensable components are extracted by means of vacuum pump 25.

Among the process advantages discovered in the course of this invention is the fact that the urea decomposition and the biuret formation at temperatures above 150° C. may be minimized if the urea is heated in the presence of at least 2% of ammonium in the form of a free gas or as ammonium carbamate. This discovery permits the carrying out of the distillation of a carbamate and its subsequent crystallization at pressures higher than 12 atmospheres and therefore makes it possible to use water as an economic direct cooling means in the apparatus in which the ammonia is condensed and the carbamate is crystallized. The ammonia and carbon dioxide if still present in the urea solution after said distillation carried out at a pressure higher than 12 atmospheres, can be separated by expanding the solution to atmospheric pressures or to pressures near atmospheric, condensing said vapors at said pressure and bringing the aqueous carbamate solution so obtained to a pressure higher than 12 atmospheres, distilling said solution to separate a part of the water present therein and recycling the vapors of ammonia, carbon dioxide and water so obtained in the zone in which the ammonia is condensed and the carbamate is crystallized.

The above process description is merely illustrative of this invention and the invention in its broadest aspects is not limited thereto. It is possible to recycle the non-converted reactants only partially where there is an economic reason for disposing of quantities of ammonium carbamate dissolved in liquid ammonia. Recent developments in the use of liquid ammonia fertilizers may make such slurries of carbamate in liquid ammonia useful as direct fertilizers.

I claim:

1. The process for the production of urea from ammonia, carbon dioxide and recycled ammonium carbamate in the form of a suspension of ammonium carbamate in liquid ammonia, which includes the steps of reacting ammonia, carbon dioxide and ammonium carbamate suspended in liquid ammonia in a pressure vessel at pressures in excess of 150 atmospheres, reducing the pressure of the reactant solution in three stages, the first stage of the reduction being to pressures in the range of 60 to 120 atmospheres, and recovering the ammonia thereby vaporized; the second stage of reduction being to pressures in the range of 13 to 25 atmospheres, wherein the residual reaction solution is cooled to a temperature below 150° C., said residual reaction solution containing urea, ammonium carbamate and more than 2% of ammonia, rapidly heating said reaction mixture containing more than 2% ammonia to temperatures in the range of 150 to 190° C. and distilling the ammonium carbmate from the urea solution, said ammonium carbamate being condensed as solid ammonium carbamate suspended in liquid ammonia, said condensation being effected in a vessel, cooling said vessel with water and agitating said suspension in said vessel; then finally reducing the pressure of said residual solution to the atmospheric range wherein excess water vapor is removed and the urea is recovered.

References Cited

UNITED STATES PATENTS

| 2,913,493 | 11/1959 | Sze et al. | 260—555 |
| 2,961,464 | 11/1960 | Kaasenbrood | 260—555 |
| 2,916,516 | 12/1959 | Michelitsch | 260—555 |

FOREIGN PATENTS

| 1,252,669 | 12/1960 | France. |

HENRY R. JILES, *Primary Examiner.*